March 3, 1959

E. S. SELMER 2,876,348

SYNCHRONIZING CIRCUITS

Filed March 18, 1954

INVENTOR.
ERNST S. SELMER
BY James B. Christie
ATTORNEY

United States Patent Office 2,876,348

Patented Mar. 3, 1959

2,876,348

SYNCHRONIZING CIRCUITS

Ernst S. Selmer, Oslo, Norway, assignor, by mesne assignments, to Burroughs Corporation, Detroit, Mich., a corporation of Michigan Application March 18, 1954, Serial No. 417,124

1 Claim. (Cl. 250—27)

Figures 1, 2:
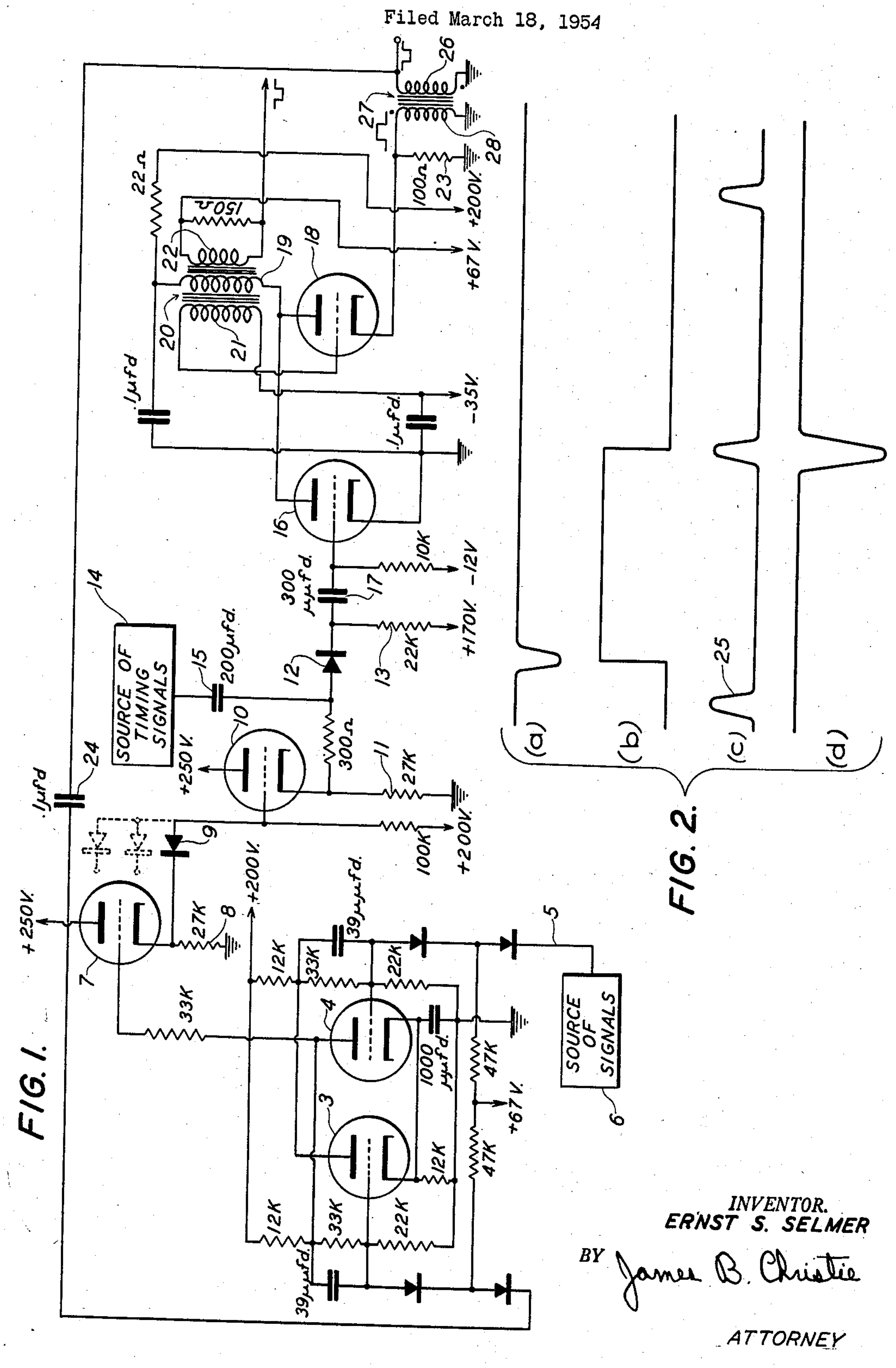

This invention relates to timing control circuits, and more particularly to an improved synchronizing circuit which in response to a first input signal provides an output signal coincident in time with a succeeding second input signal.

In electrical circuits utilizing pulse techniques for establishing a time reference, as well as in other applications, frequently it is desirable upon receiving a first signal pulse to provide an output signal for timing purposes which is coincident in time with a next succeeding pulse derived from another source. For example, in digital computing apparatus, it is well-known to employ a magnetic drum memory system comprising a rotating drum having a magnetizable periphery for the purpose of storing a quantity of digital information. Usually such a rotating drum is divided into sectors in each of which one or more digits may be recorded. In order to identify each of these sectors, a clock track surrounding the drum may be included in which a magnetic indication for each of the sectors of the drum is recorded. It will be appreciated that in order to record in the sectors of a magnetic drum, the recording apparatus should be under the control of timing pulses derived from the clock track so that one or more digits may be recorded precisely in each sector.

In order to record a plurality of digits in adjacent sectors of a magnetic drum, the information should be presented to the magnetic drum digit-after-digit at a rate which is a function of the speed of rotation of the drum. As a practical matter, in view of the relatively high rate of rotation employed for most magnetic drum memory systems, conventional input equipment is not capable of presenting the digital information to the magnetic drum at such high rates.

Therefore, a storage register is frequently interposed between the external source of digital information and the magnetic drum memory. By this means, the rate at which the information is presented to the storage register may be determined by the external means supplying the digits, and after the storage register is full, control may be transferred to the timing pulses derived from the drum so as to transfer the digital information from the storage register to sectors on the magnetic drum.

Assuming that the storage register is capable of holding a given number of digits, commonly termed a "word," a given signal from the external source of digital information must be such that it initiates control from the timing pulses of the drum. Thus, the problem arises to provides apparatus which in response to a first given signal (e. g., a signal from an external source of digital information) generates an output signal which is coincident in time with the next succeeding pulse of a second signal (e. g., the timing pulses from the clock track of the drum).

In addition, it may be desirable to synchronize other operations in a digital computer with master timing pulses. Therefore, in other instances it may be desirable to provide an output signal for initiating a selected operation when, and only when, a first signal is received and the next succeeding timing pulse occurs.

In accordance with my invention, apparatus is provided which in response to an external signal produces an output signal at a time substantially coincident with a next succeeding signal derived from a timing source. The apparatus includes a bi-stable circuit which is capable of having two stable conditions of operation, means for changing the bi-stable circuit from one condition to the other condition in response to a first input signal, gating means connected serially with the bi-stable circuit, means energizing the gating means from the bi-stable circuit, means energizing the gating means in accordance with a second input signal whereby the gating means indicates the presence and absence of that condition where the bi-stable circuit has been changed from its initial condition of operation in response to the first input signal and the second input signal occurs, and means coupling the signal output of the gating means to the bi-stable circuit whereby the bi-stable circuit is changed to its initial condition of operation in response to a signal which is a function of the indication provided by the gating means. In addition, to increase the reliability of the apparatus, a pulse generator is included at the output of the gating means for generating an output signal of a desired waveshape in response to signals of a predetermined amplitude only from the gating means.

A better understanding of the features of the present invention may be had upon a reading of the following specification, and an inspection of the drawings, in which:

Fig. 1 is a combination block and schematic circuit diagram of an embodiment of the present invention; and Fig. 2 is a graphical illustration of certain of the signal relationships occurring in the embodiment of Fig. 1.

Turning in detail to Fig. 1, electron tubes 3 and 4 are cross-coupled to provide a bi-stable circuit. Although other bi-stable circuits may be employed, the one shown is exemplary of a conventional Eccles-Jordan multivibrator. Signals applied to the bi-stable switching circuit via a lead 5 from a source of signals 6 are adapted to change the condition of operation of the bi-stable circuit from an initial condition where the right-hand electron tube 4 is conducting and the left-hand electron tube 3 is non-conducting to a second stable condition of operation wherein the right-hand electron tube 4 is non-conducting and the left-hand electron tube 3 is conducting. At this time the potential at the anode of the right-hand electron tube 4 increases in a positive direction, and this increase in potential is coupled to a cathode follower electron tube 7, thereby increasing its conduction and causing the potential across the cathode resistor 8 to increase in a positive direction.

The increase in potential across the cathode resistor 8 decreases the conduction through a unilateral conduction device, such as a diode 9, thereby increasing the potential at the control electrode of a second cathode follower electron tube 10 in a positive direction. This positive change of potential increases the conduction in the second cathode follower electron tube 10 so as to cause a positive increase in the potential across the cathode resistor 11. This tends to render a gating means, such as diode 12, conducting, but due to a threshold potential established by the biasing voltage applied to the right-hand side of the diode 12 via a resistor 13, the voltage appearing across the cathode resistor 11 is arranged so as to be insufficient to render the diode 12 substantially conducting. However, upon the arrival of a signal from a second source of control signals 14 via a coupling capacitor 15, the sum of the signal from the second source of control signals 14 and the increased potential across the cathode resistor 11 renders the diode 12 substantially conducting.

The resulting increase of positive potential at the junction of the diode 12 and the resistor 13 is coupled to the control electrode of an amplifying electron tube 16 via a coupling capacitor 17. The amplifying electron tube 16 not only amplifies the change in potential, but reverses its polarity so as to cause a negative excursion of the potential at the anode of a pulse generating electron tube 18.

This negative excursion appears across one winding 19 of a transformer 20 and is induced in another winding 21 of the transformer 20 which is suitably polarized to provide a positive excursion of the potential at the control electrode of the pulse generating electron tube 18. This tends to increase the condition in the pulse generating electron tube 18 which in turn causes the anode to go further negative, and the negative excursion of the anode potential is in turn coupled to the control electrode as a positive excursion.

The above continues until the pulse generating electron tube 18 becomes saturated and no further change in potential appears across the winding 19. At this time, the negative potential applied to the control electrode of the electron tube 18 via the winding 21 becomes effective and renders the tube substantially non-conducting. Thus, a pulse of current flows through the pulse generating electron tube 18 in response to a signal from the amplifying electron tube 16, and a negative pulse may be derived from auxiliary winding 22.

A positive pulse may be derived directly across the cathode resistor 23, or by reversing the polarity of the auxiliary winding 22 of the transformer 20.

In addition, a negative pulse may be derived from the secondary winding 26 of a transformer 27 having its primary winding 28 connected across the cathode resistor 23.

For reliability of operation of equipment to which the apparatus of the present invention is connected, it is desirable that each of the signals derived from the pulse generating electron tube 18 be identical. It has been found that very occasionally a timing pulse may be provided by the source of timing signals 14 coincident in time with the changing of the condition of operation of the bi-stable switching circuit electron tubes 3 and 4. When this occurs, a signal may be passed by the diode 12 which is of lesser amplitude than that which is passed ordinarily. This, in turn, may fail to trigger the pulse generator in exactly the same manner as the normal signals do. For this reason, the exemplary pulse generator, including the pulse generating electron tube 18, is included and it has been found that the negative signal derived from the secondary winding 26 of the cathode transformer 27 is substantially free of any false indications in response to signals passed by the diode 12 of lesser amplitude than the normal signal. Thus, inclusion of a pulse generator which is capable of discriminating between different amplitudes of input signals is desirable where the degree of reliability required of the apparatus is high. By this means all of the output signals provided by the pulse generator are substantially identical.

Thus, a pulse is provided at the output of the pulse generating electron tube 18 in response to a first signal being applied to the bi-stable switching circuit electron tubes 3 and 4 via the lead 5 and which is substantially coincident in time with the next succeeding signal supplied to the gating diode 12 from the second source of control signals 14 via the capacitor 15. In order to return the circuit to its initial condition of operation, a signal appearing at the output of the pulse generating electron tube 18 may be coupled to the bi-stable switching circuit electron tubes 3 and 4.

In the illustrative embodiment of Fig. 1, a capacitor 24 is coupled between the negative pulse output of the transformer 27 and the grid circuit of the bi-stable switching circuit electron tubes 3 and 4, thereby tending to render the electron tube 3 non-conducting. In accordance with well-known principles, this negative excursion causes a positive excursion at the anode of the electron tube 3 which in turn is coupled to the control electrode of the electron tube 4 so as to tend to increase conduction in the electron tube 4. This process is cumulative until the electron tube 3 is rendered substantially non-conducting and the electron tube 4 is rendered conducting. Thus, the anode of the electron tube 4 goes negative and this negative excursion is coupled by the cathode follower electron tube 7, the diode 9 and the cathode follower electron tube 10 to the gating diode 12, whereby any subsequent signals appearing from the second source of control signals via the capacitor 15 cannot render the gating diode 12 conducting.

Fig. 2 shows the relationships of certain signals which may occur in the circuitry of Fig. 1. Fig. 2(*a*) shows the signal provided by the source of signals 6. As was noted above, this causes the bi-stable circuit of electron tubes 3 and 4 to change its condition of operation, and the voltage at the anode of the electron tube 4 becomes more positive as shown in Fig. 2(*b*). This change of potential is coupled in like polarity via the cathode follower electron tubes 7 and 10 to one side of the gating diode 12.

Fig. 2(*c*) shows the signal provided by the source of timing signals 14. Thus, the first pulse 25 of Fig. 2(*c*) is ineffective to produce a signal at the output of the pulse generating electron tube 18. Upon the arrival of the next succeeding pulse of Fig. 2(*c*) from the source of timing signals 14, the pulse generating electron tube 18 is triggered so as to provide an output signal as shown in Fig. 2(*d*).

By means of the transfer of the signal of 2(*d*) to the bi-stable circuit so as to return it to its initial condition of operation, the voltage at the anode of the electron tube 4 becomes less positive, thereby returning to its initial condition as shown in Fig. 2(*b*). It will be noted that the next succeeding timing pulse of Fig. 2(*c*) does not produce an output signal.

Thus, as illustrated in Fig. 2, an output signal shown in Fig. 2(*d*) is provided which is responsive to an input signal of Fig. 2(*a*) and which is coincident in time with the next succeeding timing pulse of Fig. 2(*c*).

It will be appreciated that the circuitry shown may be modified in many ways without parting from the spirit of the present invention. For example, auxiliary diodes may be coupled in parallel with the diode 9 so as to allow additional control of the conditions under which the circuit is responsive to an input signal. It is well-known that diodes coupled in this manner perform a logical "and" function. By coupling a plurality of bi-stable circuits to these auxiliary diodes in a manner similar to that shown with respect to the diode 9, a circuit may be arranged so that it is necessary for a plurality of control signals to have occurred before a signal derived from the second source of control signals is effective to provide an output signal. If such is desired, the output from the pulse generating electron tube 18 may be coupled to all of the bi-stable circuits so as to place each of them in its initial condition of operation when an output signal is provided by the pulse generating electron tube 18.

Where it is desired to provide a series of output pulses, an integrating circuit or suitable counting means may be included for coupling the output of the pulse generator to the bi-stable circuit whereby the bi-stable circuit is changed to its initial condition of operation only after a desired number of output pulses have occurred at the output of the pulse generator.

I claim:

A timing control circuit including a bi-stable flip flop comprising first and second unilateral conducting devices having at least an output electrode and a control electrode, means linking the output electrode of each unilateral conducting device to the control electrode of the other unilateral conducting device, a first signal source coupled to the control electrode of said first unilateral conducting device, a pulse amplifier biased beyond cutoff, means coupling the output of said first unilateral conducting device for overcoming a portion of said bias, a second source of signals coupled to overcome the remainder of said bias, a blocking oscillator, means coupling said amplifier to said blocking oscillator, means coupling said blocking oscillator to the control electrode at the second unilateral conducting device in said flip flop, whereby a signal from said first source of signals initiates a control action by overcoming a portion of the cutoff bias of said amplifier and the control action is completed by a signal from said second source overcoming the remaining portion of said bias and operating said amplifier to cause said blocking oscillator to deliver a signal to the control electrode of said second unilateral conducting device which changes the stable condition of said flip flop.

References Cited in the file of this patent

UNITED STATES PATENTS

| | | |
|---|---|---|
| 2,414,486 | Rieke | Jan. 21, 1947 |
| 2,418,521 | Morton et al. | Apr. 8, 1947 |
| 2,421,018 | De Rosa | May 27, 1947 |
| 2,444,036 | Crost | June 29, 1948 |
| 2,468,703 | Hammel | Apr. 26, 1949 |
| 2,596,167 | Philpott | May 13, 1952 |
| 2,644,887 | Wolfe | July 7, 1953 |